March 9, 1965   H. W. DIETERT ETAL   3,172,285
PERMEABILITY METER
Filed Nov. 7, 1960   2 Sheets-Sheet 2
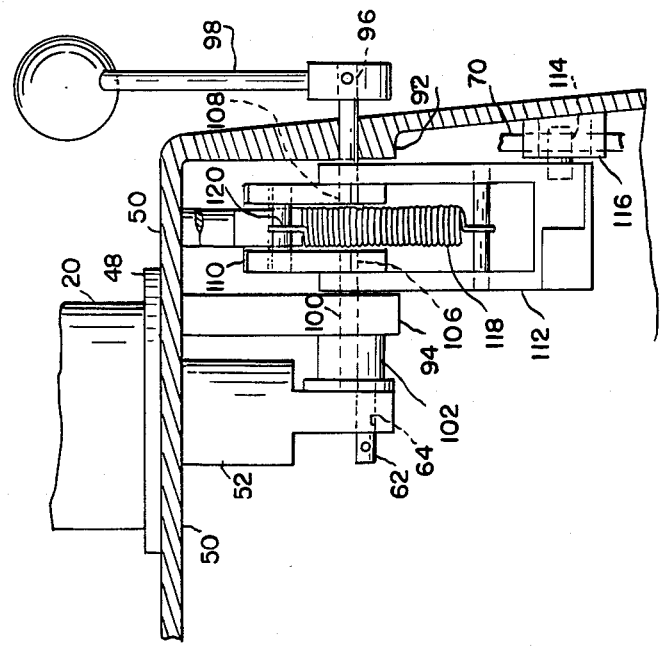
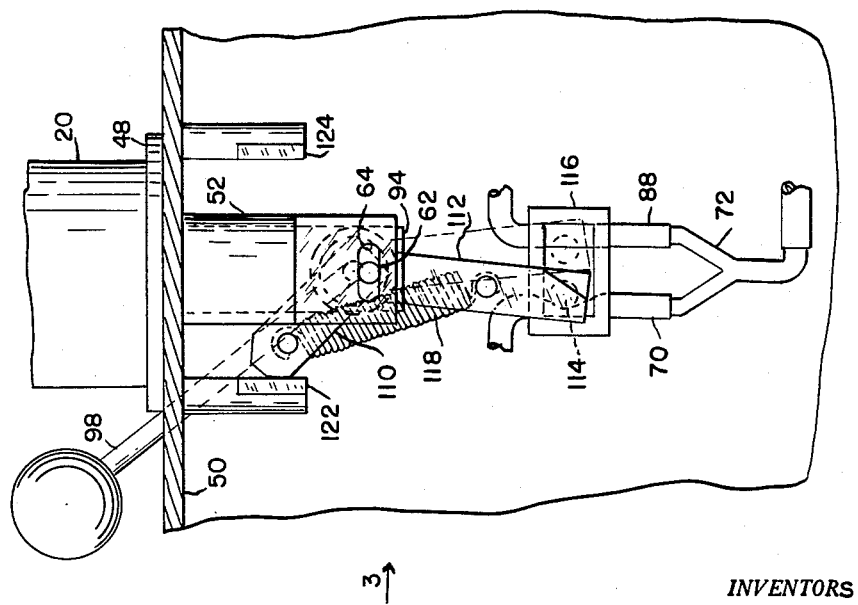
INVENTORS
HARRY W. DIETERT
RALPH E. STEINMUELLER
BY RANDOLPH L. DIETERT
ATTORNEYS United States Patent Office 3,172,285
Patented Mar. 9, 1965

3,172,285
PERMEABILITY METER
Harry W. Dietert, Kerrville, Tex., and Ralph E. Steinmueller and Randolph L. Dietert, Detroit, Mich., assignors to Harry W. Dietert Co., Detroit, Mich., a corporation of Michigan
Filed Nov. 7, 1960, Ser. No. 67,699
14 Claims. (Cl. 73—38)

The invention relates to permeability meter and refers more specifically to apparatus for rapid accurate measurement of the permeability of granular material, such as sand.

An object of the invention is to provide a permeability meter including improved actuating means.

Another object is to provide a permeability meter including pressure regulating means for producing air at a constant pressure, means for metering the air under pressure into a pressure chamber, one wall of which is formed by the sample specimen whose permeability is to be determined, and means for alternately measuring the air pressure in the pressure chamber as a direct measure of the permeability of the specimen and the air pressure produced by said pressure regulating means.

Another object is to provide a permeability meter as set forth above wherein the pressure regulating means includes a motor and blower operable to produce air pressure in a duct having an open upper end and a pivotally mounted pressure equalizing closure for the open end of the duct.

Another object is to provide a permeability meter as set forth above wherein the alternate measuring means comprises snap acting spring loaded actuating means, and means secured to the actuating means operable to alternatively close one of a pair of tubes leading directly from the pressure regulating means and from the pressure chamber respectively to a pressure gage.

Another object is to provide a permeability meter as set forth above wherein the sample specimen is contained within one end of an open ended tube and including means for sealing the other end of the tube, said last mentioned means being operated by said actuating means.

Another object is to provide a permeability meter which is simple in construction, economical to manufacture and efficient in operation.

Other objects and features of the invention will become apparent as the description proceeds, especially when taken in conjunction with the accompanying drawings, illustrating a preferred embodiment of the invention, wherein:

FIGURE 2 is an enlarged side view of the actuating means of the permeability meter illustrated in FIGURE 1.

FIGURE 3 is a front view of the actuating means illustrated in FIGURE 2 taken in the direction of the arrow 3 in FIGURE 2.

Figure 1:
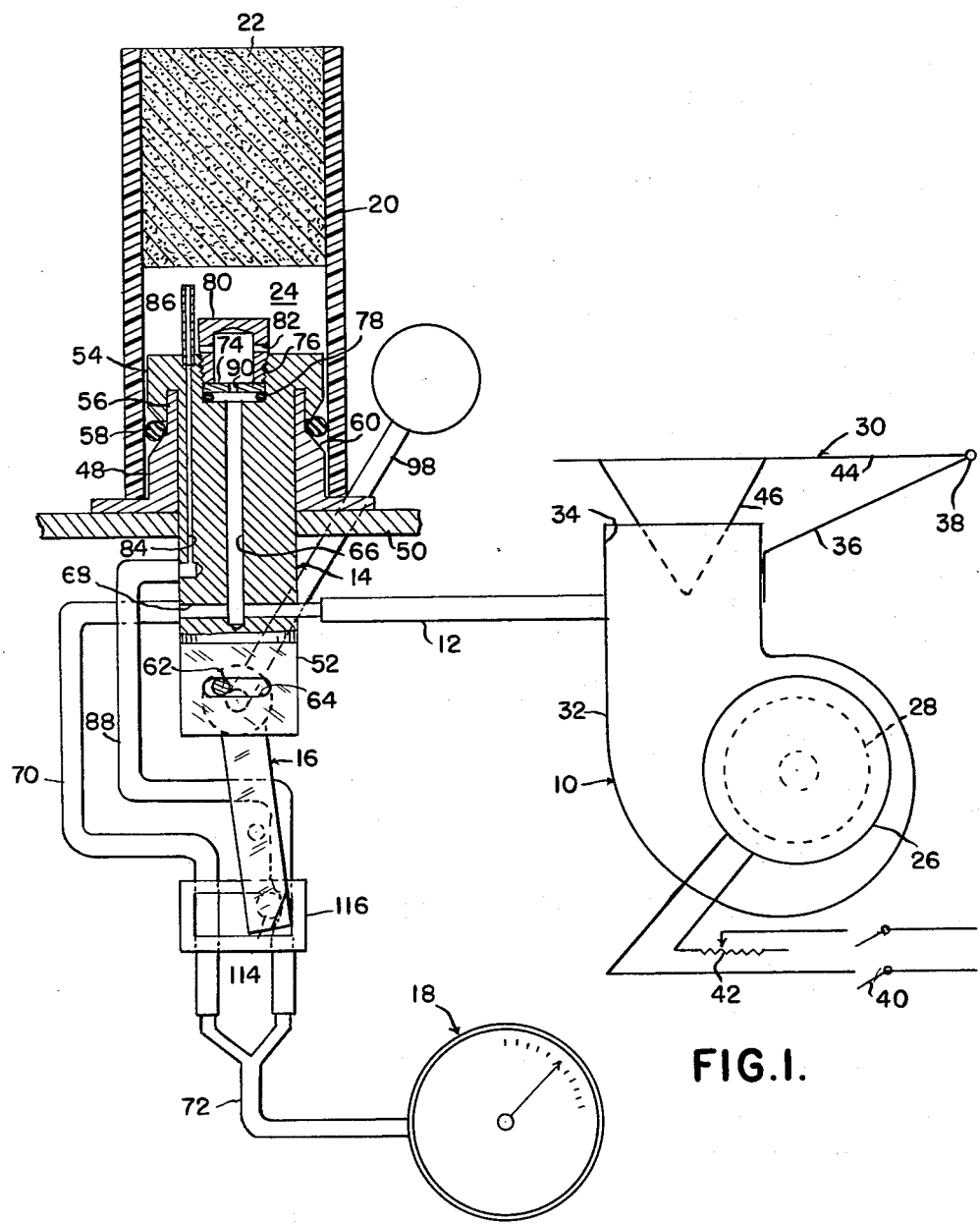
FIGURE 1 is a diagrammatic representation of the permeability meter of the invention partly in section.

With particular reference to the figures a specific embodiment of the invention will now be disclosed.

As shown best in FIGURE 1 the permeability meter comprises the pressure regulating means 10 which is operable to feed air at a controlled pressure through conduit 12 to the air metering and sample retaining means 14. The actuating means 16 shown in detail in FIGURES 2 and 3 is provided in conjunction with the air metering and sample retaining means 14 to alternatively connect the pressure sensitive gage 18 to the pressure regulating means 10 and to seal the cylinder 20 in which the sample of granular material 22 is placed to the air metering and sample retaining means 14 and connect the pressure sensitive gage 18 with the pressure chamber 24 respectively.

More specifically the pressure regulating means includes the high speed blower 26 and motor 28 therefor and the pressure equalizer 30. The pressure regulator 10 further includes the duct 32 surrounding the blower 26 and having the open end 34, and the bracket 36 pivotally mounting the pressure equalizer 30 on hinge 38. The conduit 12 is connected with the duct 32 adjacent the open end 34 thereof, as shown in FIGURE 1.

The blower 26 operates within the duct 32 on closing of the line switch 40 connected to a source of electrical energy (not shown) to produce air under pressure at the end 34 of the duct. The speed of the motor 28 and therefore the speed of the blower 26 and the air pressure at end 34 of the duct 32 is controlled by means of the rheostat 42.

The pressure equalizer 30 which acts as a closure for the open end 34 of the duct 32 serves to maintain the pressure in the conduit 12 at a constant value. The pressure equalizer 30 includes the support 44 connected to the hinge 38 and the conical member 46, the apex of which extends within the open end 34 of the duct 32. The conical member 46 is positioned centrally of the open end 34 of duct 32 and is movable substantially vertically with respect thereto for small angles of movement to the support 44 about the hinge 38. The projected area of the base of the cone, as shown in FIGURE 1, is substantially the same as that of the area of the open end of the duct 34.

Thus in operation if the pressure produced by the blower 26 and motor 28 is at a desired amount, for example ten centimeters of water, the pressure equalizer will be positioned substantially as shown in FIGURE 1. If the pressure in the duct 32 drops, the pressure equalizer 30 will pivot about the hinge 38 to enter the open end of the duct 34 whereby the area provided for escape of air around the cone in its initial position is restricted to increase the pressure in the duct 32. On pressure increases within the duct 32 the pressure equalizer 30 pivots clockwise about the hinge 38 to increase the area through which air may escape from the duct 32 to decrease the pressure therein.

It will be understood of course that the cone 46 may be of different shape, such as hemispherical, within the scope of the invention. It addition the weight of the cone may determine the regulated pressure of the pressure regulating means since for every different cone weight a different air pressure in the duct 32 will be required to pivot the pressure equalizer 30 clockwise about the hinge 38 a predetermined amount.

The air metering and sample retaining means 14 comprises the O-ring post 48 shaped as shown positioned on the support 50 and adapted to receive the specimen tube 20 sleeved thereover, as shown best in FIGURE 1. Also included in the air metering and sample retainer means 14 is the body member 52 positioned as shown with the open returned axially extending flange 54 thereon sleeved over the reduced diameter end 56 of the O-ring post 48 as shown and the O-ring 58 positioned between the flange 54 and the annular abutment 60 on the O-ring post 48.

It will be apparent that on movement of the body member 52 vertically downward by means of the camming stud 62 operating in the elongated slot 64 in the body member 52, the O-ring will be expanded radially outwardly to provide a seal between the specimen tube 20 and the O-ring post 48. The specimen tube 20 is thus retained on the O-ring post 48 and a pressure chamber 24 is formed between the sample of sand or similar granular material 22, the specimen tube 20 and the air metering and sample retaining means 14.

The air metering and sample retaining means 14 further includes the axial passage 66 extending through one end thereof into which the conduit 12 is connected, as shown in FIGURE 1. A second passage 68 also extends transversely through the body member 52 and connects to flexible hose 70 which is connected through the Y connector 72 to the pressure sensitive gage 18.

An orifice plate 74 is positioned within a recess 76 in the outer end of passage 66 in conjunction with a sealing O-ring 78 and a dust cap 80, as shown best in FIGURE 1. The dust cap 80 has the transverse passages 82 extending therethrough.

A further passage 84 extends through the body member 52 substantially parallel to the passage 66 and is connected at one end to the hollow pin 86 extending upward into the chamber 24 as shown. The passage 84 is connected at the other end to the flexible hose 88 extending to the Y connector 72 and through the connector 72 to the pressure sensitive gage 18. Thus a path for air is provided through the conduit 12, passage 66, orifice 90 in orifice plate 74, the passages 82 into the pressure chamber 24 through the pin 86, passage 84, hose 88, connector 72 to the pressure gage 18.

When the tube 88 is pinched closed, as shown in FIGURE 1, the pressure in the conduit 12 is felt by the gage 18 through the hose 70 which is necessarily open when the hose 88 is closed as will be understood subsequently. With the actuating means 14 in its alternate position the rubber hose 88 is open and the hose 70 is pinched closed so that the pressure sensitive gage provides a reading of the pressure in the chamber 24 which pressure is determined by the permeability of the specimen 22 in the specimen tube 20 and the air pressure maintained in the passage 66 by the pressure regulating apparatus 10.

It will be understood that the orifice 90 permits air to pass into the chamber 24 in accordance with the pressure in the passage 66. The passage 84 and the hollow pin 86 are of greater area than the orifice 90, as will be understood by those in the art. Thus the reading of the pressure sensitive gage 18 with the tube 70 pinched closed may be calibrated directly in terms of the permeability of the sample 22.

The actuating means 16, as shown best in FIGURES 2 and 3, is comprised of the mounting brackets 92 and 94 which may be secured to the support 50. The support 92 supports the shaft 96 having the handle 98 mounted on one end thereof for rotation therewith. Bracket 94 similarly supports the shaft 100 having the eccentric cam 102 and cam stud 62, previously referred to, mounted thereon for rotation therewith. The ends 106 and 108 of the shafts 100 and 96 are rigidly secured to the inner U bracket 110, as shown best in FIGURE 3. Thus on clockwise and counterclockwise pivotal movement of the handle 98 about the axis of the shafts 106 and 108 the upper U bracket is caused to swing to opposite sides of the support brackets 92 and 94 and the cam stud 62 is caused to move in a vertical arc.

An outer U bracket 112 is positioned between the inner U bracket 110 and the supporting posts 92 and 94, as shown best in FIGURE 3. The outer U bracket 112 is pivotally mounted on the shafts 96 and 100. The outer U bracket 112 supports the stud 114 at one side thereof adjacent the outer end operable in conjunction with the anvil member 116 to alternatively pinch the tubes 70 and 88 closed as indicated above.

The spring 118 provides a snap action of the outer U bracket 112 on pivoting of the handle 98. Thus as the handle 98 is rotated clockwise from the position shown in FIGURE 2 as the end 120 of the spring 118 passes over center of the axis of the outer U bracket 112, the outer U bracket 112 is caused to snap to the right. The rubber bumpers 122 and 124 are provided to halt the rotation of the inner U bracket 110 while there is still sufficient tension in the spring 118 to maintain the tube in engagement by the stud 114 closed. During this action of the inner U bracket 110 and outer U bracket 112 the camming stud 62 as previously indicated moves vertically downward to position the body member 52 so that the specimen tube 20 is sealed to the O-ring post 48 as previously indicated.

On subsequent counterclockwise movement of the operating handle 98 the reverse action will take place so that the actuating means will again assume the position illustrated in FIGURES 2 and 3 so that removal and repositioning of a specimen tube 20 on the O-ring post 48 may be accomplished and the air pressure in the passage 66 checked.

Thus in operation with the permeability meter actuating means in the position shown in FIGURE 2 the pressure regulating means 10 is actuated on closing of switch 40 to provide a required air pressure, for example ten centimeters of water, in the passage 66 which may be checked on reading the pressure sensitive gage 18 directly connected to the passage 66 through the rubber tube 70.

At this time a test specimen of known permeability in a specimen tube 20 may be positioned over the O-ring post 48 as shown in FIGURE 1. The handle 98 is then rotated clockwise whereupon the specimen tube 20 is sealed to the O-ring post 48 and the tube 70 is pinched closed and the tube 88 opened. The permeability of the test sample is then read directly from the gage 18 as measured by the pressure maintained in the pressure chamber 24 by the air passing through the orifice 90 and the passages 82 thereinto.

The permeability meter is now ready to test samples of sand or other granular material for permeability on subsequent repetition of the above indicated steps with a specimen of granular material having unknown permeability placed in the specimen tube 20.

It will thus be seen that in accordance with the invention there is provided a permeability meter which is simple in construction, economical to manufacture and extremely efficient in use.

The drawings and the foregoing specification constitute a description of the improved permeability meter in such full, clear, concise and exact terms as to enable any person skilled in the art to practice the invention, the scope of which is indicated by the appended claims.

What we claim as our invention is:

1. A permeability meter comprising a pressure chamber, one side of which is formed by a sample specimen, the permeability of which is to be determined, sealing means for sealing the sample specimen to the permeability meter, a constant pressure source connected to said pressure chamber, metering means between said constant pressure source and said pressure chamber for regulating the pressure in the pressure chamber, pressure gage means, and actuating means for alternatively connecting said pressure gage means to said constant pressure source and for connecting said pressure gage means to said pressure chamber and operating the sealing means to seal the sample specimen to the permeability meter.

2. A permeability meter comprising a pressure chamber, one side of which is formed by a sample specimen, the permeability of which is to be determined held within one end of an open ended specimen tube, sealing means for sealing the other end of the specimen tube, a constant pressure source connected to said pressure chamber, metering means between said constant pressure source and said pressure chamber for regulating the pressure in the pressure chamber, pressure gage means, and actuating means for alternatively connecting said pressure gage means to said constant pressure source and for connecting said pressure gage means to said pressure chamber and operating the sealing means to seal the other end of said specimen tube.

3. A permeability meter comprising a pressure chamber, one side of which is formed by a sample specimen, the permeability of which is to be determined held within one end of an open ended specimen tube, sealing means for sealing the other end of the specimen tube, a constant pressure source connected to said pressure chamber, metering means between said constant pressure source and said pressure chamber for regulating the pressure in the pressure chamber, pressure gage means, and actuating means for alternatively connecting said pressure gage means to said constant pressure source and for simultaneously connecting said pressure gage sealing means to said pressure chamber and operating the means to seal the other end of said specimen tube.

4. A permeability meter comprising a pressure chamber, one side of which is formed by a sample specimen, the permeability of which is to be determined held within one end of an open ended specimen tube, sealing means for sealing the other end of the specimen tube, including a fixedly mounted, hollow, specimen tube post having an annular exterior offset providing a large and small diameter end, a radially deformable O-ring sealing member sleeved over said post abutting said offset, and a body member slidably positioned within said post having an open returned annular flange at one end thereof extending over the small end of the post and abutting the sealing member, whereby with said other end of said specimen tube positioned over said post a seal is formed between the sealing member and specimen tube on deformation of said sealing member between said flange and offset, a constant pressure source connected to said pressure chamber, metering means between constant pressure source and said pressure chamber for regulating the pressure in the pressure chamber, pressure gage means, and actuating means for alternatively connecting said pressure gage means to said constant pressure source and for connecting said pressure gage means to said pressure chamber and operating the sealing means to seal the other end of said specimen tube.

5. A permeability meter comprising a pressure chamber, one side of which is formed by a sample specimen, the permeability of which is to be determined, a constant pressure source connected to said pressure chamber, metering means separate from said constant pressure source between said constant pressure source and said pressure chamber for regulating the pressure in the pressure chamber, pressure gage means, and means for alternatively connecting said pressure gage means to said pressure chamber and said constant pressure source, including deformable tubing connecting said constant pressure source and said pressure chamber to said pressure gage means and actuating means for alternatively pinching the tubing closed.

6. A permeability meter comprising a pressure chamber, one side of which is formed by a sample specimen, the permeability of which is to be determined, a constant pressure source connected to said pressure chamber, metering means separate from said constant pressure source between said constant pressure source and said pressure chamber for regulating the pressure in the pressure chamber, pressure gage means, and means for alternatively connecting said pressure gage means to said pressure chamber and said constant pressure source, including deformable tubing connecting said constant pressure source and said pressure chamber to said pressure gage means and snap acting spring loaded actuating means for alternatively pinching the tubing closed.

7. A permeability meter comprising a pressure chamber, one side of which is formed by a sample specimen, the permeability of which is to be determined, a constant pressure source connected to said pressure chamber, metering means separate from said constant pressure source between said constant pressure source and said pressure chamber for regulating the pressure in the pressure chamber, pressure gage means, and means for alternatively connecting said pressure gage means to said pressure chamber and said constant pressure source, including deformable tubing connecting said constant pressure source and said pressure chamber to said pressure gage means and snap acting spring loaded actuating means including a stud and stationary anvil for alternatively pinching the tubing closed.

8. A permeability meter comprising a pressure chamber, one side of which is formed by a sample specimen, the permeability of which is to be determined held within one end of an open ended specimen tube, means for sealing the other end of the specimen tube, including a fixedly mounted, hollow, specimen tube post having an annular exterior offset providing a large and small diameter end, a radially deformable O-ring sealing member sleeved over said post abutting said offset, and a body member slidably positioned within said post having an open returned annular flange at one end thereof extending over the small end of the post and abutting the sealing member, whereby with said other end of said specimen tube positioned over said post a seal is formed between the sealing member and specimen tube on deformation of said sealing member between said flange and offset due to vertical movement of said body member, a contant pressure source, metering means between said constant pressure source and said pressure chamber, pressure gage means, actuating means for alternatively connecting said pressure gage means to said constant pressure source and for connecting said pressure gage means to said pressure chamber and sealing the other end of said specimen tube, including deformable tubing connecting said constant pressure source and said pressure chamber to said pressure gage means and actuating means for alternatively pinching the tubing closed, said actuating means also including an eccentric camming stud and an elongated transverse recess in said body member cooperable with said stud to produce vertical movement of said body member on operation of said actuating means.

9. A permeability meter comprising a pressure chamber, one side of which is formed by a sample specimen, the permeability of which is to be determined, a constant pressure source, including a duct for a flowable medium having an opening therein, means for passing the flowable medium under pressure through the duct, and a guided closure for the opening in the duct biased toward a closed position by a substantially constant force operable to maintain the pressure of said flowable medium within the duct substantially constant, metering means between said constant pressure source and said pressure chamber, pressure gage means, and means for alternatively connecting said pressure gage means to said pressure chamber and said constant pressure source including deformable tubing connecting said constant pressure source and said pressure chamber to said pressure gage means and actuating means for alternatively pinching the tubing closed.

10. A permeability meter comprising a pressure chamber, one side of which is formed by a sample specimen, the permeability of which is to be determined, held within one end of an open-ended specimen tube, means for sealing the other end of the specimen tube, a constant pressure source incliduing a duct for a flowable medium having an opening therein, means for passing the flowable medium under pressure through the duct, and a guided closure of varying cross section positioned within the opening in the duct, said closure having a base substantially equal in projected area to the area of the opening in the duct, said closure being biased toward a closed position by a substantially constant force whereby said closure is operable to maintain the pressure of said flowable medium substantially constant, metering means between said constant pressure source and said pressure chamber, pressure gage means, and actutaing means for alternatively connecting said pressure gage means to said constant pressure source and for simultaneously connecting said pressure gage means to said pressure chamber and sealing the other end of said specimen tube.

11. A permeability meter comprising a pressure chamber, one side of which is formed by a sample specimen, the permeability of which is to be determined held within one end of an open ended specimen tube, means for sealing the other end of the specimen tube, including a fixedly mounted, hollow, specimen tube post having an annular exterior offset providing a large and small diameter end, a radially deformable O-ring sealing member sleeved over said post abutting said offset, and a body member slidably positioned within said post having an open returned annular flange at one end thereof extending over the small end of the post and abutting the sealing member, whereby with said other end of said specimen tube positioned over said post a seal is formed between the sealing member and specimen tube on deformation of said sealing member between said flange and offset due to vertical movement of said body member, a constant pressure source, metering means between said constant pressure source and said pressure chamber, pressure gage means, actuating means for alternatively connecting said pressure gage means to said constant pressure source and for connecting said pressure gage means to said pressure chamber and sealing the other end of said specimen tube, including deformable tubing connecting said constant pressure source and said pressure chamber to said pressure gage means and actuating means for alternatively pinching the tubing closed.

12. A permeability meter comprising a pressure chamber, one side of which is formed by a sample specimen, the permeability of which is to be determined held within one end of an open ended specimen tube, means for sealing the other end of the specimen tube, including a fixedly mounted, hollow, specimen tube post having an annular exterior offset providing a large and small diameter end, a radially deformable O-ring sealing member sleeved over said post abutting said offset, and a body member slidably positioned within said post having an open returned annular flange at one end thereof extending over the small end of the post and abutting the sealing member, whereby with said other end of said specimen tube positioned over said post a seal is formed between the sealing member and specimen tube on deformation of said sealing member between said flange and offset due to vertical movement of said body member, a constant pressure source, metering means between said constant pressure source and said pressure chamber, pressure gage means, actuating means for alternatively connecting said pressure gage means to said constant pressure source and for connecting said pressure gage means to said pressure chamber and sealing the other end of said specimen tube.

13. A permeability meter comprising a pressure chamber, one side of which is formed by a sample specimen, the permeability of which is to be determined, held within one end of an open-ended specimen tube, means for sealing the other end of the specimen tube, a constant pressure source, metering means between said constant pressure source and said pressure chamber, pressure gage means, and actuating means for alternatively connecting said pressure gage means to said constant pressure source and for simultaneously connecting said pressure gage means to said pressure chamber and sealing the other end of said specimen tube.

14. A permeability meter comprising a pressure chamber, one side of which is formed by a sample specimen, the permeability of which is to be determined, held within one end of an open-ended specimen tube, means for sealing the other end of the specimen tube, a constant pressure source including a duct for a flowable medium having an opening therein, means for passing the flowable medium under pressure through the duct and a guided closure of varying cross-section positioned within the opening in the duct gravity urged toward a closed position, metering means between said constant pressure source and said pressure chamber, pressure gage means, and actuating means for alternatively connecting said pressure gage means to said constant pressure source and for simultaneously connecting said pressure gage means to said pressure chamber and sealing the other end of said specimen tube.

References Cited by the Examiner

UNITED STATES PATENTS

| | | | |
|---|---|---|---|
| 2,194,891 | 3/40 | Dietert | 73—38 X |
| 2,243,937 | 6/41 | Almond | 251—75 X |
| 2,342,616 | 2/44 | O'Brien. | |
| 2,465,818 | 3/49 | Richardson | 73—38 |
| 2,472,689 | 6/49 | Adams et al. | 177—209 X |
| 2,556,689 | 6/51 | Grove | 251—7 |
| 2,636,379 | 4/53 | Van Dorn | 73—37.8 |
| 2,664,277 | 12/53 | Davies | 251—9 X |
| 2,919,573 | 1/60 | Berkley et al. | 73—38 |
| 2,969,968 | 1/61 | Miller | 177—208 X |
| 2,993,368 | 7/61 | Schlein | 73—38 X |
| 2,997,873 | 8/61 | Dexter | 73—37.8 |
| 3,021,790 | 2/62 | Brunson. | |

FOREIGN PATENTS 442,365   2/36   Great Britain.

ISAAC LISANN, *Primary Examiner.*